(12) United States Patent
Nishimura et al.

(10) Patent No.: US 10,116,020 B2
(45) Date of Patent: Oct. 30, 2018

(54) BATTERY PACK WITH BRANCHING COOLING DUCT

(71) Applicant: GS Yuasa International Ltd., Kyoto-shi (JP)

(72) Inventors: Yosuke Nishimura, Kyoto (JP); Hiroaki Kakimura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 252 days.

(21) Appl. No.: 15/166,041

(22) Filed: May 26, 2016

(65) Prior Publication Data

US 2016/0351978 A1   Dec. 1, 2016

(30) Foreign Application Priority Data

Jun. 1, 2015 (JP) ................................. 2015-111498

(51) Int. Cl.
*H01M 10/6556* (2014.01)
*H01M 10/663* (2014.01)
(Continued)

(52) U.S. Cl.
CPC ....... *H01M 10/663* (2015.04); *B60L 11/1874* (2013.01); *B60L 11/1879* (2013.01); *H01M 2/1077* (2013.01); *H01M 10/613* (2015.04); *H01M 10/625* (2015.04); *H01M 10/6557* (2015.04); *H01M 10/6563* (2015.04); *H01M 10/6566* (2015.04); *B60L 2240/545* (2013.01); *H01M 10/643* (2015.04); *H01M 10/647* (2015.04); *H01M 2220/20* (2013.01)

(58) Field of Classification Search
CPC ............. H01M 10/613; H01M 2/1077; H01M 10/6556; H01M 10/6557; B60L 11/1874; B60L 11/1877; B60H 1/00278
See application file for complete search history.

(56) References Cited

U.S. PATENT DOCUMENTS 5,257,463 A * 11/1993 Wheeler ........... H01M 10/6563
165/80.2
6,586,132 B1 * 7/2003 Fukuda ............... H01M 2/1077
429/120
(Continued)

FOREIGN PATENT DOCUMENTS

JP   H 11-329517 A   11/1999
JP   2002-033137 A   1/2002
(Continued)

*Primary Examiner* — Imran Akram
(74) *Attorney, Agent, or Firm* — McGinn I.P. Law Group, PLLC (57) ABSTRACT

A battery pack includes: energy storage devices arranged with a gap which is formed between the energy storage devices for passing a fluid; a case configured to accommodate the energy storage devices; a first duct disposed in an inside of the case and defining a supply flow passage through which the fluid is supplied to the gap; and a second duct disposed in the inside of the case and defining a discharge flow passage through which the fluid which has passed through the gap is discharged, wherein an auxiliary flow passage where the fluid flows along an outer surface of the first duct is formed, and the fluid is made to flow through the supply flow passage and the auxiliary flow passage at a same time.

12 Claims, 7 Drawing Sheets

(51) Int. Cl.
*H01M 10/6566* (2014.01)
*H01M 10/6568* (2014.01)
*H01M 10/613* (2014.01)
*H01M 10/625* (2014.01)
*B60L 11/18* (2006.01)
*H01M 2/10* (2006.01)
*H01M 10/6563* (2014.01)
*H01M 10/6557* (2014.01)
*H01M 10/647* (2014.01)
*H01M 10/643* (2014.01)

(56) References Cited

U.S. PATENT DOCUMENTS

| | | | | |
|---|---|---|---|---|
| 2008/0187820 A1* | 8/2008 | Nakano | ............... | H01G 2/08 429/83 |
| 2011/0206948 A1* | 8/2011 | Asai | ............... | H01M 2/0473 429/7 |
| 2012/0121959 A1* | 5/2012 | Yamada | ............... | B60K 1/04 429/100 |
| 2012/0121962 A1* | 5/2012 | Katayama | ............... | B60K 1/04 429/120 |
| 2013/0059180 A1* | 3/2013 | Yang | ............... | H01M 2/1077 429/72 |
| 2013/0177791 A1* | 7/2013 | Takahashi | ............... | H01M 10/482 429/72 |
| 2015/0343919 A1* | 12/2015 | Sakata | ............... | B60L 11/1877 320/109 |

FOREIGN PATENT DOCUMENTS

| | | |
|---|---|---|
| JP | 2004-273237 A | 9/2004 |
| JP | 2005-094928 A | 4/2005 |
| JP | 2005-116342 A | 4/2005 |
| JP | 2006-269220 A | 10/2006 |
| JP | 2008-117599 A | 5/2008 |
| JP | 4126726 B2 | 7/2008 |
| JP | 2008-254607 A | 10/2008 |
| JP | 2010-018156 A | 1/2010 |
| JP | 2014-026734 A | 2/2014 |

* cited by examiner

BATTERY PACK WITH BRANCHING COOLING DUCT

CROSS-REFERENCE TO RELATED APPLICATIONS

This application claims the benefit of Japanese patent application No. 2015-111498, filed on Jun. 1, 2015, which is incorporated by reference.

FIELD

The present invention relates to a battery pack in which a plurality of energy storage devices are accommodated in a case.

BACKGROUND

Figure 8:
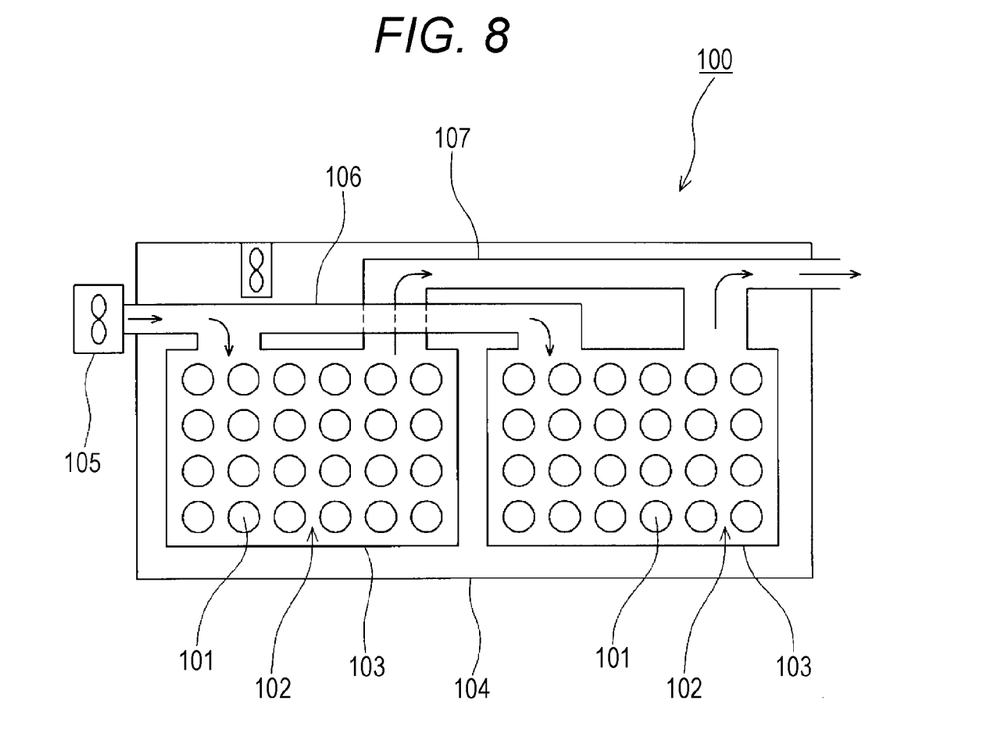
FIG. 8 is a schematic view showing a configuration of a conventional battery pack.

Conventionally, there has been known an assembled battery in which a plurality of cells are accommodated in an assembled battery case (see JP-A-11-329517). The assembled battery is mounted on an electric vehicle or a hybrid vehicle (hereinafter simply referred to as "vehicle"), for example. As shown in FIG. 8, the assembled battery includes: a plurality of modules 102 in each of which a plurality of cells 101 are connected to each other in series and/or in parallel to each other; a plurality of module cases 103 in each of which each module 102 is accommodated; and an assembled battery case 104 in which all module cases 103 are accommodated. The assembled battery 100 includes a cell cooling fan 105. The assembled battery 100 also includes: a duct 106 through which outside air is supplied to the inside of the module case 103 from the outside of the assembled battery case 104; and a duct 107 through which air used for cooling the cells 101 in the module case 103 is discharged to the outside of the assembled battery case 104. The ducts 106, 107 are disposed in the inside of the assembled battery case.

In this assembled battery 100, outside air is supplied to the inside of the module case 103 through the duct 106 having the cell cooling fan 105 and, after outside air flows through the module case 103 while being brought into contact with the cells 101, outside air is discharged to the outside of the assembled battery case 104 through the duct 107. With such an operation, the cells 101 are cooled.

When an ambient temperature around a vehicle (outside temperature) is high so that an inner temperature of the assembled battery case 104 is increased, the cooling efficiency may be lowered. That is, due to the increase of the inner temperature of the assembled battery case 104, a temperature of outside air which flows through the duct 106 disposed in the inside of the assembled battery case 104 (to be more specific, the duct 106 through which outside air is supplied to the inside of the module case 103) may be increased by being influenced by the inner temperature.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide a battery pack where a duct through which a fluid is supplied to an energy storage device is disposed in the inside of a case, and the influence of an inner temperature of the case exerted on the fluid which flows through the inside of the duct can be suppressed.

A battery pack according to an aspect of the present invention includes: a plurality of energy storage devices arranged with a gap which is formed between the energy storage devices for passing a fluid; a case configured to accommodate the plurality of energy storage devices; a first duct disposed in an inside of the case and defining a supply flow passage through which the fluid is supplied to the gap; and a second duct disposed in the inside of the case and defining a discharge flow passage through which the fluid which has passed through the gap is discharged, wherein an auxiliary flow passage through which the fluid flows along an outer surface of the first duct is formed, and the fluid is made to flow through the supply flow passage and the auxiliary flow passage at a same time.

BRIEF DESCRIPTION OF DRAWINGS

The foregoing and other features of the present invention will become apparent from the following description and drawings of an illustrative embodiment of the invention in which.

DESCRIPTION OF EMBODIMENTS

According to an aspect of the present intention, there is provided a battery pack which includes: a plurality of energy storage devices arranged with a gap which is formed between the energy storage devices for passing a fluid; a case configured to accommodate the plurality of energy storage devices; a first duct disposed in an inside of the case and defining a supply flow passage through which the fluid is supplied in the gap; and a second duct disposed in the inside of the case and defining a discharge flow passage through which the fluid which has passed through the gap is discharged, wherein an auxiliary flow passage through which the fluid flows along an outer surface of the first duct is formed, and the fluid is made to flow through the supply flow passage and the auxiliary flow passage at a same time.

With such a configuration, when a fluid flows through the inside of the first duct (supply flow passage), the fluid also flows along the outer surface of the first duct. Accordingly, the influence of an inner temperature of the case exerted on the fluid which flows through the inside of the first duct can be suppressed.

The plurality of energy storage devices may be arranged in a row in a first direction, the first duct may extend in the first direction and may face in an opposed manner the plurality of energy storage devices in a second direction which is orthogonal to the first direction, and the auxiliary flow passage may be defined by the case and the outer surface of the first duct.

With such a configuration, a part of the outer surface of the first duct in the circumferential direction faces in an opposed manner the plurality of energy storage devices. Accordingly, even when a fluid is not made to flow over the entire region of the outer surface of the first duct in the circumferential direction, the influence of an inner temperature of the case exerted on a fluid which flows through the inside of the first duct can be suppressed.

The flow direction of the fluid in the supply flow passage and the flow direction of the fluid in the auxiliary flow passage may preferably be substantially equal.

With such a configuration, compared to the case where the flow direction of the fluid in the supply flow passage and the flow direction of the fluid in the auxiliary flow passage are opposite to each other, it is possible to suppress the temperature difference between the fluid which flows inside a duct wall of the first duct and the fluid which flows outside the duct wall of the first duct at respective positions in the direction that the supply flow passage extends and hence, it is possible to suppress a change in temperature of the duct wall of the first duct. Accordingly, it is possible to more effectively suppress a change in temperature of a fluid which flows through the supply flow passage.

The first duct may preferably include a branching portion which makes the supply flow passage and the auxiliary flow passage communicate with each other, and the branching portion may preferably be disposed at a position upstream of a position where the first duct reaches the energy storage device in the flow direction of the fluid in the supply flow passage.

With such a configuration, a fluid which flows through the supply flow passage is branched by the branching portion and flows along both sides (inside and outside) of the duct wall of the first duct and hence, in a region downstream of the branching portion, the temperature difference between the fluids which flow inside and outside of the duct wall can be more effectively suppressed. Accordingly, a change in temperature of the fluid which flows through the supply flow passage can be suppressed more effectively.

The second duct may include a merging portion which makes the auxiliary flow passage and the discharge flow passage communicate with each other, and the merging portion may be disposed at a position downstream of the first duct in the flow direction of the fluid in the auxiliary flow passage.

With such a configuration, a fluid which flows through the auxiliary flow passage along the first duct is discharged to the outside of the case through the discharge flow passage. Accordingly, the number of portions for discharging the fluid to the outside from the case (that is, portions which make the inside and outside of the case communicate with each other) can be reduced and hence, the intrusion of water or the like into the inside of the case can be prevented.

As has been described above, according to the aspects present invention, it is possible to provide a battery pack where a duct through which a fluid is supplied to energy storage devices is disposed in the inside of a case, and the influence of an inner temperature of the case exerted on the fluid which flows through the inside of the duct can be suppressed.

Hereinafter, one embodiment of the present invention will be described with reference to FIG. 1 to FIG. 7. Names of respective components (respective constitutional elements) of this embodiment are used only for this embodiment, and these names may differ from names of respective components (respective constitutional elements) in BACKGROUND.

Figure 1:
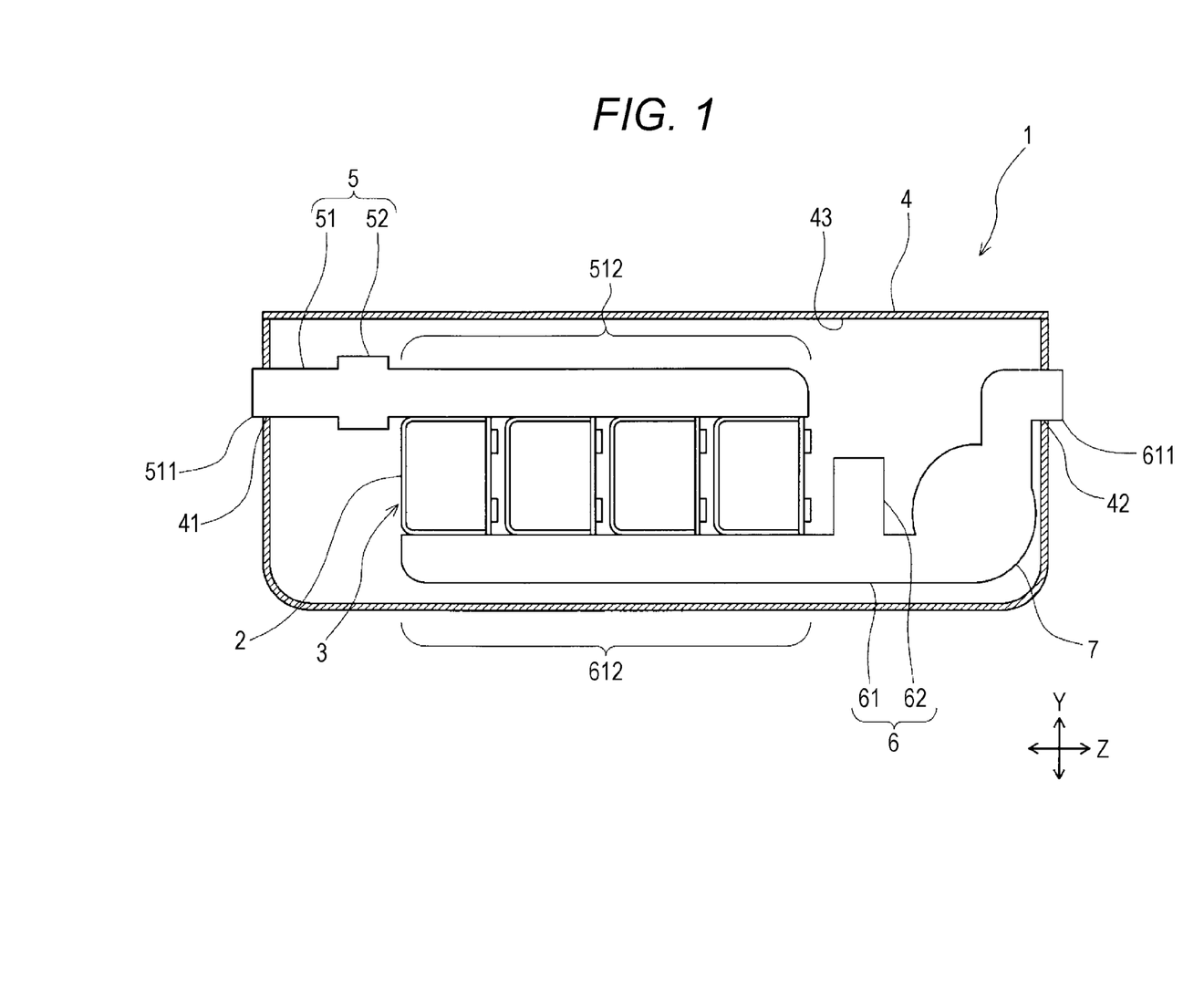
FIG. 1 is a schematic view showing a configuration of a battery pack according to an embodiment.

A battery pack of this embodiment is a battery pack mounted on an electric vehicle or a hybrid vehicle (hereinafter simply referred to as "vehicle"), for example. As shown in FIG. 1, the battery pack includes a plurality of energy storage devices 2 arranged with a gap formed between each pair of energy storage devices 2, a case 4 for accommodating the plurality of energy storage devices 2 therein, and a first duct 5 and a second duct 6 disposed in the inside of the case 4. In the battery pack 1 of this embodiment, a battery module 3 is constituted by the plurality of energy storage devices 2 arranged in a direction perpendicular to a paper surface on which FIG. 1 is drawn. The plurality of battery modules 3 are disposed in the inside of the case 4 with a gap formed between each pair of battery modules 3 in a direction along which the first duct 5 and the second duct 6 extend. Further, the battery pack 1 has a suction portion 7 for sucking a fluid (in-vehicle air in an example of this embodiment) for adjusting a temperature of the energy storage devices 2 into the inside of the first duct 5. The suction portion 7 is provided to the second duct 6.

Figure 2:
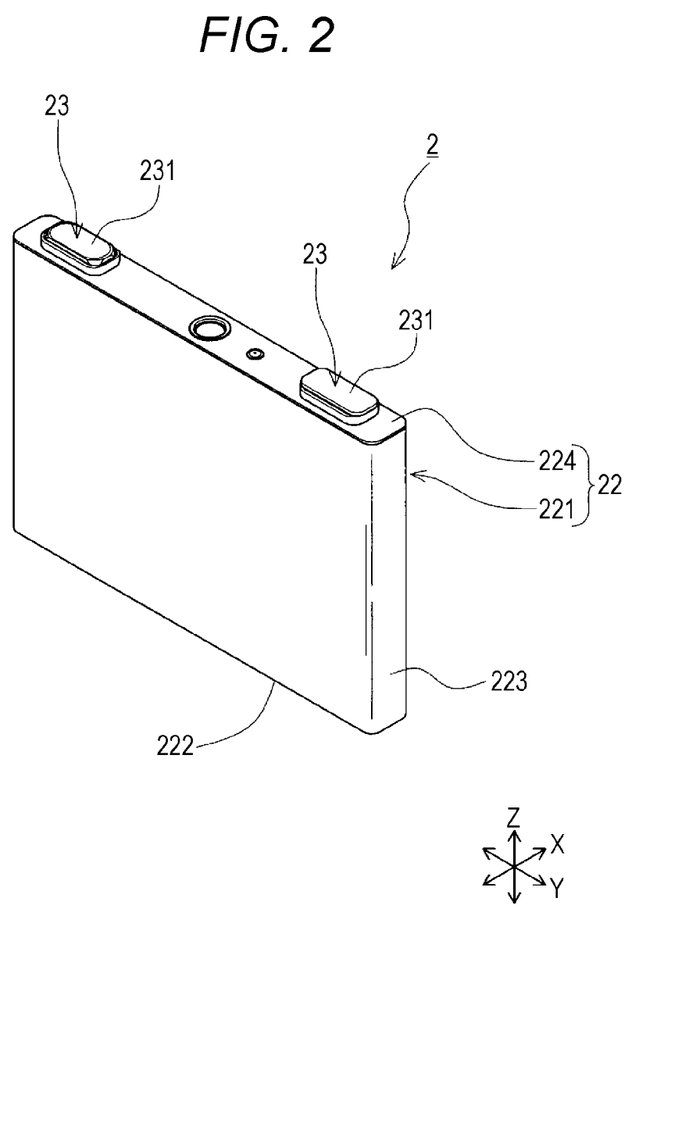
FIG. 2 is a perspective view showing an energy storage device used for the battery pack.
Figure 3:
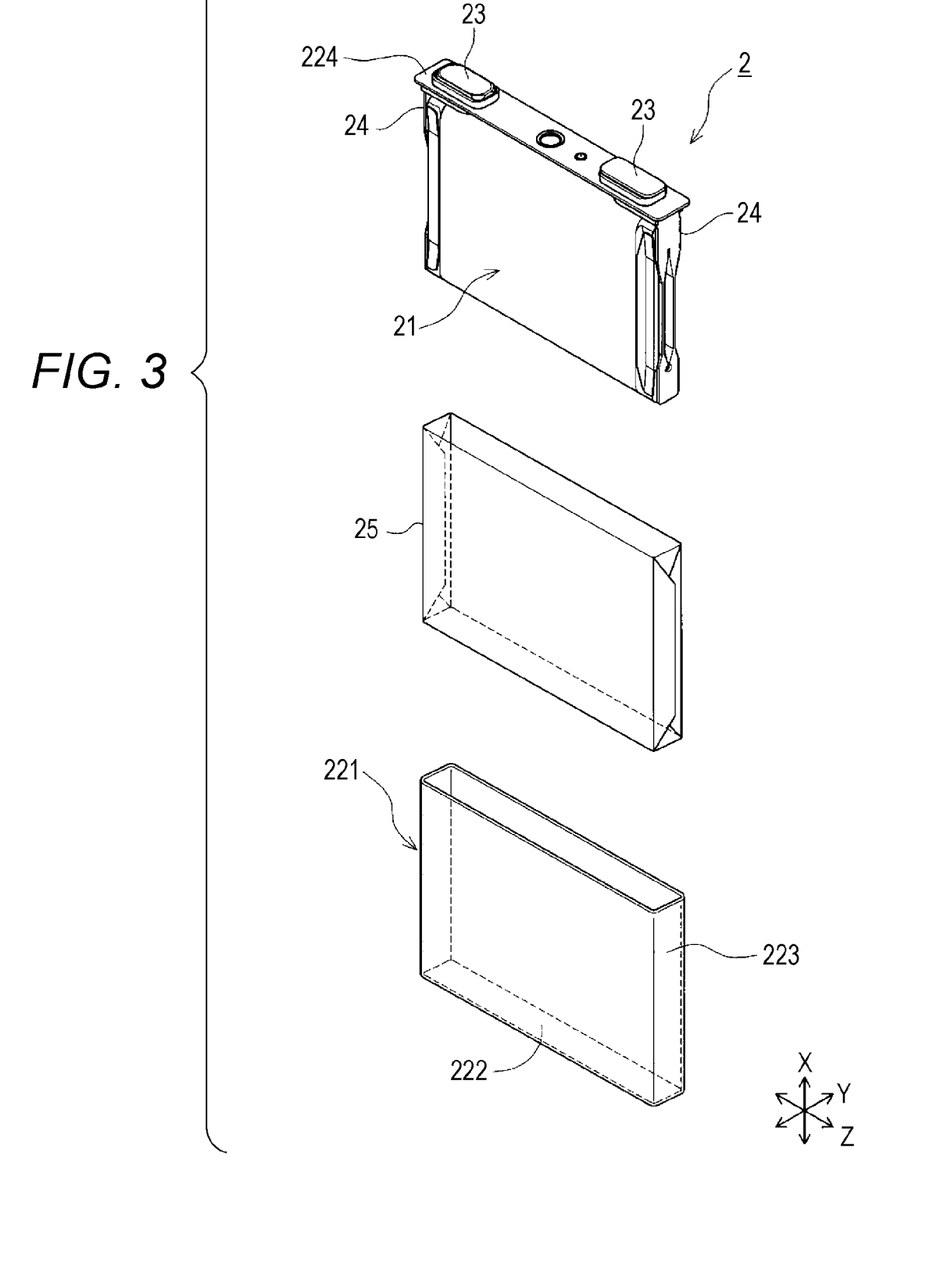
FIG. 3 is an exploded perspective view of the energy storage device.

As shown in FIG. 2 and FIG. 3, the energy storage device 2 includes an electrode assembly 21 where positive electrodes and negative electrodes are stacked to each other with a separator interposed between the positive electrode and the negative electrode, a cell case 22 which accommodates the electrode assembly 21 together with an electrolyte solution, external terminals 23 disposed on an outer surface of the cell case 22, and current collectors 24 which make the electrode assembly 21 and the external terminals 23 conductive with each other. Further, the energy storage device 2 includes an insulating member 25 which is disposed between the electrode assembly 21 and the cell case 22 and insulates the electrode assembly 21 and the cell case 22 from each other.

The cell case 22 includes a case body 221 having an opening, and a lid plate 224 which closes the opening of the case body 221. The case body 221 includes a closed portion 222 having a rectangular plate shape, and a barrel portion 223 having a flat prismatic cylindrical shape which is connected to a peripheral edge of the closed portion 222. The lid plate 224 is a plate-like member which closes the opening of the case body 221. The lid plate 224 is welded to the case body 221 at a boundary portion between the lid plate 224 and the case body 221 in a state where a peripheral edge portion of the lid plate 224 is made to overlap with a peripheral edge portion of the opening of the case body 221 so as to close the opening of the case body 221.

Each of the external terminals 23 is a portion electrically connected to an external terminal of another energy storage device, external equipment or the like. The external terminals 23 are made of a material having conductivity. Each of the external terminals 23 has a surface (a flat surface in an example of this embodiment) 231 to which a bus bar or the like is weldable.

The current collectors 24 are made of a material having conductivity. The current collectors 24 are disposed in the inside of the cell case 22, and are directly or indirectly connected with the electrode assembly 21 and the external terminals 23 in a conductive manner.

Figure 4:
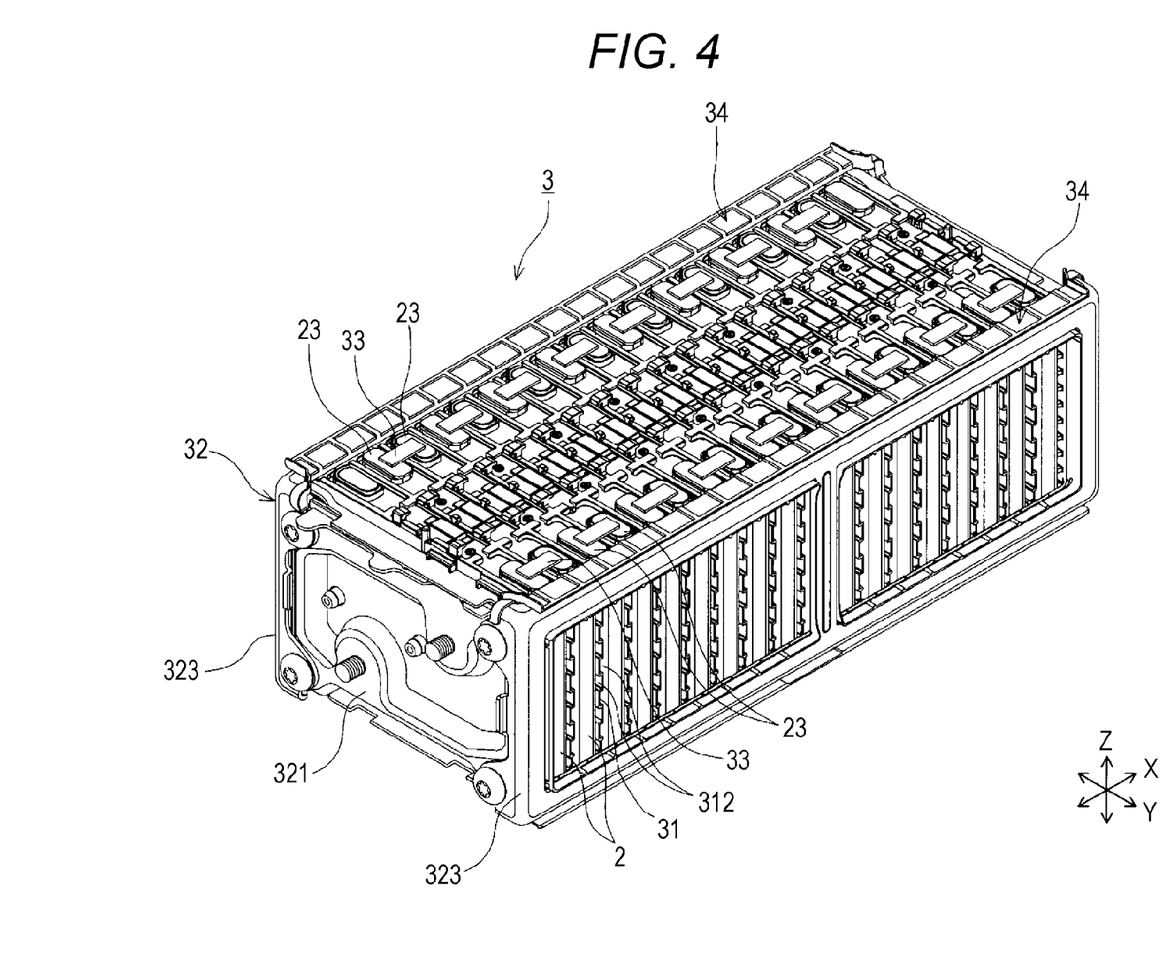
FIG. 4 is a perspective view of a battery module used for the battery pack.
Figure 5:
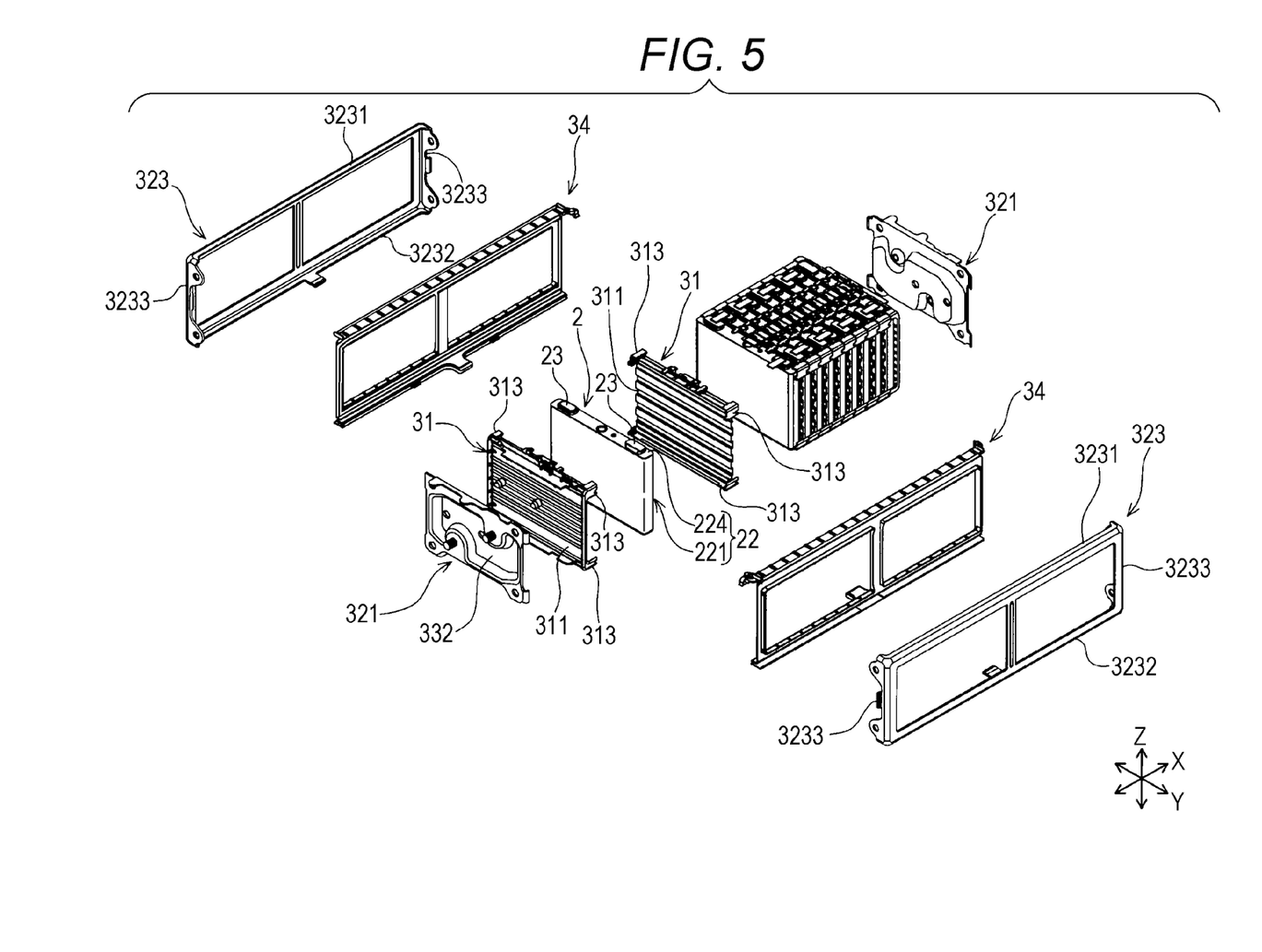
FIG. 5 is an exploded perspective view of the battery module.

As shown in FIG. 4 and FIG. 5, the battery module 3 includes: the plurality of energy storage devices 2 arranged in one direction; a plurality of spacers 31 each of which is disposed adjacently to each energy storage device 2; a holder 32 which electrically holds the plurality of energy storage devices 2 and the plurality of spacers 31 together; and a plurality of bus bars 33 each of which connects the external terminals 23 of the neighboring energy storage devices 2 to each other. Further, the battery module 3 includes insulators 34 which insulate the holder 32 and the plurality of energy storage devices 2 arranged in a row from each other. Hereinafter, in the battery module 3, assume a direction along which the energy storage devices 2 are arranged as an X axis direction in an orthogonal coordinate system, assume a longitudinal direction of the lid plate 224 of the energy storage device 2 as a Y axis direction in the orthogonal coordinate system, and assume a thickness direction of the lid plate 224 of the energy storage device 2 as a Z axis direction in the orthogonal coordinate system.

The spacer 31 has insulating property, and includes: a base 311 which is disposed adjacently to the energy storage devices 2 (to be more specific, cases 22); and restricting portions 313 which prevent the positional displacement of the energy storage devices 2 disposed adjacently to the base 311. The base 311 extends along a Y-Z plane (a plane including a Y axis and a Z axis). Passages 312 through which in-vehicle air passes are formed between the base 311 and the energy storage device 2 disposed adjacently to the base 311 due to a cross-sectional shape of the base 311 along an X-Z plane (a plane including an X axis and the Z axis). The base 311 has a profile substantially equal to a profile (a rectangular shape in an example of this embodiment) of the energy storage device 2 as viewed in the X axis direction.

In the battery module 3 of this embodiment, the base 311 of the spacer 31 which is disposed between two energy storage devices 2 disposed adjacently to each other has a rectangular corrugated cross section (cross section taken along the X-Z plane). With such a configuration, the base 311 of the spacer 31 disposed between two energy storage devices 2 disposed adjacently to each other forms passages 312 between the base 311 and the energy storage device 2 which is disposed adjacently to the base 311 on one side in the X axis direction, and forms passages 312 between the base 311 and the energy storage device 2 which is disposed adjacently to the base 311 on the other side in the X axis direction. That is, in the battery module 3 of this embodiment, the passages 312 are formed between the energy storage devices 2 which are disposed adjacently to each other with the spacer 31 sandwiched therebetween.

The base 311 of the spacer 31 which is disposed adjacently to (outside) the energy storage device 2 which is disposed on the outermost side out of the plurality of energy storage devices 2 arranged in a row in the X axis direction has a plate-like portion which expands along the Y-Z plane and a plurality of projecting ridges which project in the X axis direction from the plate-like portion (to be more specific, toward the neighboring energy storage device 2) and extend in the Y axis direction. The plurality of projecting ridges are disposed in a spaced-apart manner in the Z axis direction. With such a configuration, the passages 312 are formed between the base 311 of the spacer 31 which is disposed adjacently to the energy storage device 2 disposed on the outermost side and the energy storage device 2 which is disposed adjacently to the base 311 on one side (or the other side) in the X axis direction. With such a configuration, in the battery module 3 of this embodiment, the passages 312 are also formed on the outside of the energy storage device 2 which is disposed on the outermost side in the X axis direction.

The restricting portions 313 restrict the movement of the energy storage device 2 in the Y-Z plane direction with respect to the base 311. Each restricting portion 313 extends in the X axis direction from each corner portion of the base 311.

The holder 32 includes: a pair of terminal members 321 which sandwiches the plurality of energy storage devices 2 therebetween in the X axis direction; and a pair of frames 323 which connects the pair of terminal members 321 to each other.

Each of the pair of terminal members 321 has a pressure contact portion 322 which expands in the Y-Z plane direction and is brought into pressure contact with the energy storage device 2 with the spacer 31 interposed therebetween.

Each frame 323 includes: a first connecting portion 3231 which extends in the X axis direction and connects the pair of terminal members 321 to each other; and a second connecting portion 3232 which extends in the X axis direction at a position different from a position of the first connecting portion 3231 in the Z axis direction and connects the pair of terminal members 321 to each other. The first connecting portion 3231 is disposed at a position which corresponds to the lid plate 224 of the energy storage device 2 in the Z axis direction. The second connecting portion 3232 is disposed at a position which corresponds to the closed portion 222 of the energy storage device 2 in the Z axis direction. The frame 323 further includes a pair of support portions 3233 which extends in the Z axis direction and connects end portions of the first connecting portion 3231 and end portions of the second connecting portion 3232 to each other. By connecting the end portions of the first connecting portion 3231 and the end portions of the second connecting portion 3232 to each other by the support portions 3233, the frame 323 is formed into a frame body shape. The frames 323 each having the above-mentioned configuration are disposed adjacently to the plurality of energy storage devices 2 which are arranged in a row in the X axis direction on one side and the other side in the Y axis direction.

Returning to FIG. 1, an accommodating space is formed in the inside of the case 4, and the case 4 accommodates the plurality of battery modules 3 which are arranged in a row in the Z axis direction in a spaced-apart manner in the accommodating space. In the case 4, by fastening the holders 32 of the respective battery modules 3 to the case 4 using fastening members such as screws, the respective battery modules 3 are fixed to the inside of the case 4. The case 4 has two opening portions 41, 42 through which the inside and the outside of the case 4 are made to communicate with each other. One end 511 of the first duct 5 is connected to one opening portion 41, and one end 611 of the second duct 6 is connected to the other opening portion 42. In the case 4 of this embodiment, the plurality of battery modules 3, the first duct 5, the second duct 6, and the suction portion 7 are accommodated. In the case 4, a space which allows in-vehicle air to pass therethrough is formed between an outer surface of the first duct 5 and the case 4 (the inner surface 43 of the case 4). Further, a space which allows in-vehicle air to pass therethrough is formed also between an outer surface of the second duct 6 and the case 4 (inner surface 43 of the case 4). Hereinafter, flow passages for in-vehicle air which are formed by these spaces (the space defined by the inner surface 43 of the case 4 and the outer surface of the first duct 5, and the space defined by the inner surface 43 of the case 4 and the outer surface of the second duct 6) are referred to as auxiliary flow passages respectively.

The first duct 5 defines a supply flow passage for supplying in-vehicle air to the gaps formed between the energy storage devices 2 (in an example of this embodiment, the passages 312 each of which is formed between the spacer 31 and the energy storage device 2 disposed adjacently to the spacer 31). The first duct 5 includes: a first duct body 51; and a branching portion 52 which makes the supply flow passage and the auxiliary flow passage communicate with each other. The first duct 5 of this embodiment is made of metal and has a metal duct wall.

One end 511 of the first duct body 51 is connected to the opening portion 41 of the case 4 as described above, and the other end portion 512 of the first duct body 51 is connected to the respective battery modules 3. The other end portion 512 of the first duct body 51 is connected to the frames 323 of the respective battery modules 3 on one side, and in-vehicle air which flows into the inside of the first duct body 51 from one end 511 of the first duct body 51 is supplied to the respective flow passages 312 of the battery modules 3. In this embodiment, the first duct body 51 extends in the Z axis direction (first direction) and is disposed so as to face the plurality of battery modules 3 in an opposed manner in the Y axis direction (second direction).

The branching portion 52 is disposed at the position upstream of the position where the first duct 5 (to be more specific, first duct body 51) reaches the battery modules 3 (energy storage devices 2) in the flow direction of in-vehicle air in the supply flow passage. The branching portion 52 is disposed between one end 511 of the first duct body 51 and the battery module 3 which is disposed at the uppermost position out of the plurality of battery modules 3. The more upstream side of the first duct body 51 the branching portion 52 is positioned, the more preferably the branching portion 52 is positioned. In this embodiment, the branching portion 52 is disposed in the vicinity of one end 511 of the first duct body 51 (the opening portion 41 of the case 4). The branching portion 52 is formed of at least one through hole which is formed in the first duct body 51 (a hole which makes the inside and the outside of the first duct body 51 communicate with each other). When a plurality of through holes are formed in the first duct body 51, the plurality of through holes are formed in the first duct body 51 in a spaced-apart manner in a circumferential direction.

The second duct 6 defines a discharge flow passage for discharging in-vehicle air which passes through the gaps each of which is formed between the energy storage devices 2 (in an example of this embodiment, the passages 312 each of which is formed between the spacer 31 and the energy storage device 2 disposed adjacently to the spacer 31) to the outside of the case 4. The second duct 6 includes: a second duct body 61; and a merging portion 62 which makes the auxiliary flow passage and the discharge flow passage communicate with each other.

As described previously, one end 611 of the second duct body 61 is connected to the opening portion 42 of the case 4, and the other end portion 612 of the second duct body 61 is connected to the respective battery modules 3. The other end portion 612 of the second duct body 61 is connected to the frames 323 of the respective battery modules 3 on the other side (frames on a side opposite to the frames 323 to which the first duct body 51 is connected), and allows in-vehicle air which passes through the gaps each of which is defined between the energy storage devices 2 in the respective battery modules 3 to flow into the second duct body 61. The second duct body 61 of this embodiment extends in the Z axis direction (first direction) on a side opposite to the first duct body 51 in the Y axis direction with respect to the respective battery modules 3, and is disposed so as to face the plurality of battery modules 3 in an opposed manner in the Y axis direction (second direction).

The merging portion 62 is formed on the second duct 6 (second duct body 61) at the position downstream of the first duct 5 in the flow direction of in-vehicle air in the auxiliary flow passage (the direction that in-vehicle air flows toward the merging portion 62 from the branching portion 52 along the first duct 5, the plurality of battery modules 3 and the second duct 6 in an example of this embodiment). The merging portion 62 is disposed between one end 611 of the second duct body 61 and the battery module 3 which is disposed at the most downstream position out of the plurality of battery modules 3. The merging portion 62 of this embodiment is disposed at the position downstream of the other end portion 612 of the second duct body 61. The merging portion 62 is constituted of a through hole formed in the second duct body 61 (a hole which makes the inside and the outside of the second duct body 61 communicate with each other); and an electromagnetic valve which opens and closes the through hole.

The suction portion 7 is mounted on the second duct body 61, and sends out air in the second duct body 61 to one end 611 side from the other end portion 612 side. The suction portion 7 is disposed at the middle position of the second duct body 61 (to be more specific, the position between the merging portion 62 and one end 611). The suction portion 7 in this embodiment is formed of an air blower.

In the above-mentioned battery pack 1, firstly, the suction portion 7 is operated and, at the same time, the electromagnetic valve of the merging portion 62 is opened. As a result, in-vehicle air flows through the supply flow passage, the discharge flow passage and the auxiliary flow passage (see an arrow in FIG. 6). Hereinafter, the flow of in-vehicle air is described in detail.

Figure 6:
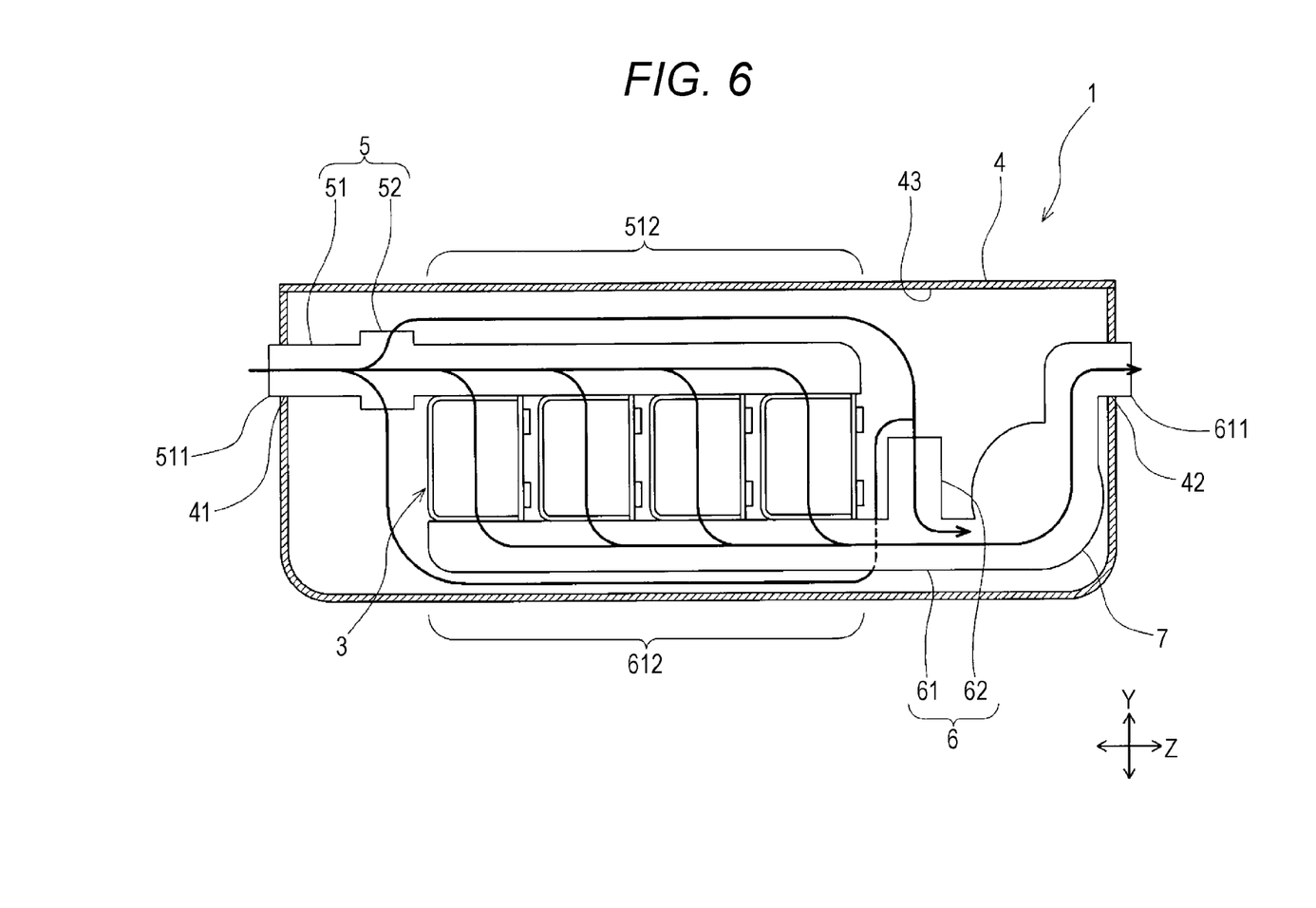
FIG. 6 is a view showing the flow of in-vehicle air in the battery pack.

First, when the suction portion 7 is operated and, at the same time, the electromagnetic valve of the merging portion 62 is opened, in-vehicle air is sucked into the first duct body 51 from one end 511 of the first duct body 51, and in-vehicle air flows through the inside of the first duct body 51 toward the other end portion 512. At this stage of the operation, the electromagnetic valve is opened and hence, air in the case 4 (air present in between the inner surface 43 of the case 4 and the outer surface of the first duct body 51 and air present in between the inner surface 43 of the case 4 and the outer surface of the second duct body 61) is sucked into the inside of the second duct body 61. Accordingly, in-vehicle air in the first duct body 51 flows such that a portion of in-vehicle air is branched by the branching portion 52, and flows out to the outside of the first duct body 51.

In-vehicle air which flows out to the outside of the first duct body 51 flows through the auxiliary flow passage (the flow passage defined by the inner surface 43 of the case 4 and the outer surface of the first duct body 51, and the flow passage defined by the inner surface 43 of the case 4 and the outer surface of the second duct body 61), and is sucked into the inside of the second duct body 61 from the merging portion 62. At this stage of the operation, in-vehicle air which flows through the auxiliary flow passage flows along the outer surface of the first duct body 51. Further, the flow of in-vehicle air in the first duct body 51 and the flow of in-vehicle air along the outer surface of the first duct body 51 have the same flow direction.

In-vehicle air which passes through the branching portion 52 in the first duct body 51 is supplied to the passages 312 of the respective battery modules 3. The passages 312 extend parallel to the direction along which the lid plate 224 of the cell case 22 extends. In other words, the passages 312 extend parallel to the direction along which the external terminals 23, 23 are arranged on the lid plate 224 of the cell case 22. In-vehicle air which passes through the passages 312 (in-vehicle air which is subjected to heat exchange with the energy storage devices 2 by being brought into contact with the energy storage devices 2 at the time of passing through the passages 312) is discharged to the outside of the case 4 through the second duct body 61. Further, in-vehicle air which flows out to the outside of the first duct body 51 from the branching portion 52 and flows through the auxiliary flow passage (that is, the in-vehicle air which flows along the first duct body 51 and outside the first duct body 51) is sucked into the second duct body 61 through the merging portion 62, is merged with in-vehicle air which flows through the inside of the second duct body 61, and is discharged to the outside of the case 4. In the battery pack 1 of this embodiment, the temperature adjustment of the respective energy storage device 2 of the battery module 3 is performed as described above.

When the electromagnetic valve of the merging portion 62 is closed in a state where the suction portion 7 is operated, in the first duct 5, branching of the flow of in-vehicle air at the branching portion 52 is stopped. That is, it is possible to stop the flowing out of in-vehicle air to the outside (auxiliary flow passage) of the first duct body 51 from the branching portion 52. In this case, in-vehicle air which is sucked into the inside of the first duct body 51 from one end 511 of the first duct body 51 is discharged to the outside of the case 4 through the passages 312 of the respective battery modules 3 and the second duct body 61 without flowing along the outer surface of the first duct body 51.

According to the battery pack 1 of this embodiment, when in-vehicle air (fluid) flows through the first duct body 51 (supply flow passage), in-vehicle air flows along the first duct body 51 and hence, the influence of an inner temperature of the case 4 exerted on in-vehicle air which flows through the inside of the first duct body 51 can be suppressed. That is, in the battery pack 1 of this embodiment, when an outside air temperature (a temperature of air outside the vehicle) is high so that a temperature of air in the case 4 is increased in the summer season or the like, in-vehicle air which is cooled by an air conditioner or the like is sucked and flows through the inside of the first duct body 51 for cooling the energy storage devices 2 of the respective battery modules 3. In the battery pack 1 of this embodiment, in-vehicle air flow along the first duct body 51 outside the first duct body 51 when in-vehicle air flows through the first duct body 51 and hence, the influence of an inner temperature of the case 4 exerted on in-vehicle air which flows through the inside of the first duct body 51 can be suppressed whereby it is possible to favorably cool the energy storage devices 2 of the respective battery modules 3. Further, in extremely cold regions or the like, when an outside air temperature (a temperature of air outside the vehicle) is low so that a temperature of air in the case 4 is lowered in the winter season, in-vehicle air which is heated by an air conditioner or the like is sucked and flows through the inside of the first duct body 51 for heating the energy storage devices 2 of the respective battery modules 3. In the battery pack 1 of this embodiment, in-vehicle air flows along the first duct body 51 outside the first duct body 51 when in-vehicle air flows through the first duct body 51 and hence, the influence of an inner temperature of the case 4 exerted on in-vehicle air which flows through the inside of the first duct body 51 can be suppressed whereby it is possible to favorably heat the energy storage devices 2 of the respective battery modules 3.

In the battery pack 1 of this embodiment, the first duct body 51 extends in the Z axis direction and is disposed so as to face the plurality of battery modules 3 in an opposed manner in the Y axis direction. A portion of the outer surface of the first duct body 51 in the circumferential direction faces the plurality of battery modules 3 in an opposed manner and hence, even when in-vehicle air is not made to flow along the entire region of the outer surface of the first duct body 51 in the circumferential direction, the influence of an inner temperature of the case 4 exerted on in-vehicle air which flows through the inside of the first duct body 51 can be suppressed.

In the battery pack 1 of this embodiment, the flow direction of in-vehicle air in the supply flow passage (the flow passage for in-vehicle air defined by the first duct 5) and the flow direction of in-vehicle air in the auxiliary flow passage (the flow passages for in-vehicle air defined by the inner surface 43 of the case 4 and respective outer surfaces of the first duct 5 and the second duct 6) are equal. Accordingly, compared to the case where the flow direction of in-vehicle air in the supply flow passage and the flow direction of in-vehicle air in the auxiliary flow passage are opposite to each other, it is possible to suppress the temperature difference between in-vehicle air which flows inside a duct wall of the first duct 5 and in-vehicle air which flows outside the duct wall of the first duct 5 at respective positions in the direction that the supply flow passage extends. Accordingly, it is possible to suppress a change in temperature of the duct wall of the first duct 5. As a result, it is possible to more effectively suppress a change in temperature of in-vehicle air which flows through the supply flow passage.

In the battery pack 1 of this embodiment, the branching portion 52 is disposed at the position upstream of the position where the first duct body 51 reaches the battery module 3 in the flow direction of in-vehicle air in the first duct body 51 (supply flow passage). Accordingly, a portion of in-vehicle air which flows through the first duct body 51 (supply flow passage) is branched by the branching portion 52 so that in-vehicle air flows along both sides (inside and outside) of the duct wall of the first duct body 51. Due to such an operation, in a region downstream of the branching portion 52, the temperature difference between in-vehicle air which flows inside the duct wall and in-vehicle air which flows outside the duct wall can be effectively suppressed. As a result, a change in temperature of in-vehicle air which flows through the first duct body 51 (supply flow passage) can be suppressed more effectively.

In the battery pack 1 of this embodiment, the merging portion 62 is disposed on the second duct body 61 at the position downstream of the first duct 5 in the flow direction of in-vehicle air in the second duct body 61 (auxiliary flow passage). Accordingly, in-vehicle air which flows through the auxiliary flow passage along the first duct body 51 is discharged to the outside of the case 4 through the second duct body 61 (discharge flow passage). Accordingly, the number of portions for discharging a fluid such as in-vehicle air to the outside from the case 4 (that is, the number of portions which make the inside and the outside of the case 4 communicate with each other) can be reduced. As result, the intrusion of water or the like into the inside of the case 4 can be prevented.

Figure 7:
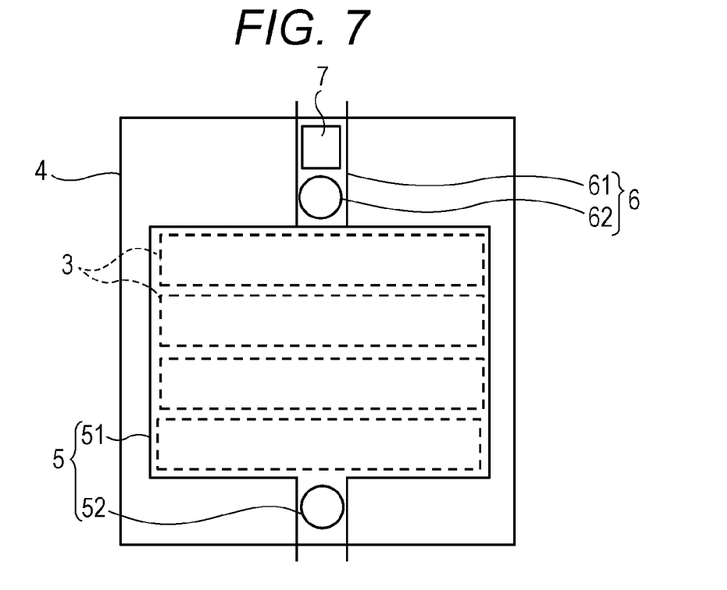
FIG. 7 is a plan view showing an example of a duct shape.

FIG. 7 is a plan view showing an example of the shape of the first duct 5 and an example of the shape of the second duct 6. Shapes of the first duct 5 and the second duct 6 are not limited to such shapes. With respect to the duct body 51 of the first duct 5, as viewed in a plan view, a portion of the duct body 51 downstream of the branching portion 52 has a larger width size (size in the direction orthogonal to the flow direction) than the branching portion 52 so that the portion of the duct body 51 covers upper portions of the plurality of battery modules 3 which are disposed in a spaced-apart manner in the flow direction of in-vehicle air. With respect to the duct body 61 of the second duct 6, as viewed in a plan view, a portion of the duct body 61 upstream of the merging portion 62 has a larger width size than the merging portion 62 so that the portion of the duct body 61 covers lower portions of the plurality of battery modules 3. The largest width side of the duct body 51 is set larger than a size in the stacking direction of the energy storage devices of the battery modules 3. The duct body 61 may have substantially the same shape as the duct body 51.

It is needless to say that the battery pack of the present invention is not limited to the battery pack of the above-mentioned embodiment, and various modifications are conceivable without departing from the gist of the present invention. For example, the configuration of another embodiment may be added to the configuration of one embodiment, or a part of the configuration of one embodiment may be replaced with the configuration of another embodiment. Further, a part of the configuration of one embodiment may be eliminated.

In the battery pack 1 of the above-mentioned embodiment, the plurality of battery modules 3 are disposed in the inside of the case 4. However, the battery pack 1 is not limited to such a configuration. For example, the battery pack 1 may be configured such that a plurality of energy storage devices 2 are disposed in the inside of the case 4 in a state where gaps which allow a fluid (in-vehicle air or the like) to pass therethrough are formed in the plurality of energy storage devices 2.

In the battery pack 1 of the above-mentioned embodiment, a temperature of the energy storage devices 2 is adjusted by taking in-vehicle air into the first duct 5. However, the battery pack 1 is not limited to such a configuration. For example, the battery pack 1 may be configured to adjust a temperature of the energy storage devices 2 by taking vehicle-outside air (outside air) into the first duct 5.

The battery pack 1 of the above-mentioned embodiment is mounted on an electric vehicle or a hybrid vehicle. However, the battery pack 1 may be mounted on other apparatuses, equipment and the like.

In the battery pack 1 of the above-mentioned embodiment, the suction portion 7 is disposed at the middle portion of the second duct body 61. However, the battery pack 1 is not limited to such a configuration. For example, the suction portion 7 may be disposed at the middle portion of the first duct body 51. Further, the suction portion 7 may be arranged on one end 511 of the first duct body 51 or one end 611 of the second duct body 61. In this case, the suction portion 7 may be disposed outside the case 4.

In the battery pack 1 of the above-mentioned embodiment, the through hole formed in the second duct body 61 is opened and closed by the electromagnetic valve in the merging portion 62. However, the battery pack 1 is not limited to such a configuration. Provided that the through hole can be opened and closed, other mechanisms or the like may be adopted. The second duct 6 may not be provided with the configuration which opens or closes the through hole. The second duct 6 may be configured such that a fan or the like is mounted in the through hole.

In the battery pack 1 of the above-mentioned embodiment, air (gas) flows through the supply flow passage, the discharge flow passage, and the auxiliary flow passage. However, the battery pack 1 is not limited to such a configuration. The battery pack 1 may have the configuration where liquid such as a coolant flows through the supply flow passage, the discharge flow passage, and the auxiliary flow passage.

What is claimed is:

1. A battery pack comprising:
    a plurality of energy storage devices arranged with a gap which is formed between the energy storage devices for passing a fluid;
    a case configured to accommodate the plurality of energy storage devices;
    a first duct disposed in an inside of the case and defining a supply flow passage through which the fluid is supplied to the gap;
    a second duct disposed in the inside of the case and defining a discharge flow passage through which the fluid which has passed through the gap is discharged; and
    an auxiliary flow passage defined by the case and the outer surface of the first duct,
    wherein the first duct includes a branching portion which is configured for the supply flow passage and the auxiliary flow passage to communicate with each other, and
    wherein the branching portion is disposed at a position upstream of a position where the first duct reaches the energy storage device in the flow direction of the fluid in the supply flow passage.

2. The battery pack according to claim 1, wherein the plurality of energy storage devices are arranged in a row in a first direction,
    the first duct extends in the first direction and faces in an opposed manner the plurality of energy storage devices in a second direction which is orthogonal to the first direction.

3. The battery pack according to claim 2, wherein each of the energy storage devices includes a battery module where the energy storage devices are stacked in a third direction orthogonal to the first and second directions by way of a spacer, and
    an air flow passage is formed between the spacer and the energy storage device disposed adjacently to the spacer.

4. The battery pack according to claim 3, wherein the air flow passage extends parallel to a direction along which external terminals in each energy storage device are arranged.

5. The battery pack according to claim 3, wherein the first duct extends in the first direction and the third direction and faces the battery module in an opposed manner.

6. The battery pack according to claim 1, wherein the flow direction of the fluid in the supply flow passage and the flow direction of the fluid in the auxiliary flow passage are substantially equal.

7. The battery pack according to claim 1, wherein the second duct includes a merging portion which makes the auxiliary flow passage and the discharge flow passage communicate with each other, and
    the merging portion is disposed at a position downstream of the first duct in the flow direction of the fluid in the auxiliary flow passage.

8. The battery pack according to claim 7, wherein the second duct has a valve which opens and closes the merging portion.

9. The battery pack according to claim 7, wherein the second duct has a suction portion.

10. The battery pack according to claim 1, wherein the first duct has a metal duct wall.

11. A vehicle equipped with the battery pack according to claim 1.

12. The vehicle according to claim 11, wherein in-vehicle air is made to pass through the gap.

* * * * *